United States Patent [19]

Machi et al.

[11] 4,066,522

[45] Jan. 3, 1978

[54] PROCESS FOR THE PRODUCTION OF HIGH MOLECULAR WEIGHT ACRYLAMIDE POLYMERS

[75] Inventors: Sueo Machi, Takasaki; Takeshi Wada, Ibaragi; Hiroshi Sekiya, Takasaki, all of Japan

[73] Assignee: Japan Atomic Energy Research Institute, Tokyo, Japan

[21] Appl. No.: 649,021

[22] Filed: Jan. 14, 1976

[30] Foreign Application Priority Data

Jan. 16, 1975 Japan ................................. 50-7222

[51] Int. Cl.$^2$ ........................... C08F 2/46; C08F 4/08
[52] U.S. Cl. .............................. 204/159.24; 526/208; 526/216; 526/303
[58] Field of Search ................... 204/159.24; 526/303, 526/208, 216

[56] References Cited

U.S. PATENT DOCUMENTS

| | | | |
|---|---|---|---|
| 3,666,740 | 5/1972 | Kargin et al. | 204/159.24 X |
| 3,926,756 | 12/1975 | Restaino | 204/159.22 |
| 3,948,740 | 4/1976 | Phalangas | 204/159.24 |

FOREIGN PATENT DOCUMENTS 2,508,346  8/1975  Germany.

*Primary Examiner*—Howard E. Schain
*Assistant Examiner*—W. C. Danison, Jr.
*Attorney, Agent, or Firm*—Browdy and Neimark

[57] ABSTRACT

High molecular weight water-soluble acrylamide polymers can be produced in good yield by irradiating a solution comprising acetone, water and acrylamide with an ionizing radiation in the presence of an alkaline salt.

12 Claims, No Drawings

PROCESS FOR THE PRODUCTION OF HIGH MOLECULAR WEIGHT ACRYLAMIDE POLYMERS

This invention relates to a process for the production of acrylamide polymers. More particularly, the invention concerns an improved process for the production of water-soluble acrylamide polymers having high molecular weight by means of irradiation polymerization.

In accordance with the present invention, water-soluble acrylamide polymers having high molecular weight are obtained by irradiating a solution mixture containing a very small amount of an alkaline salt as well as acetone, water and an acrylamide monomer with an ionizing radiation. The term "acrylamide polymers" herein used includes both homopolymers and copolymers of acrylamide.

Acrylamide polymers have numerous uses in a wide range of fields including, for example, as precipitation and flocculation agents, as paper strengthening reagent and the like. In most of such uses, the acrylamide polymers are preferably required to possess a remarkably high degree of polymerization.

Known processes for the direct production of powdered polymers include a process which comprises homopolymerization of acrylamide and one comprising copolymerization of acrylamide monomer with another monomer in an organic polymerization solvent. These processes, however, have a defect in that due to the chain transfer reaction caused by the use of an organic solvent, polymers having high degree of polymerization are difficult to obtain. To solve this problem, various types of polymerization processes for improving the degree of polymerization of the polymers to be obtained in precipitating media in the presence of an organic solvent have been proposed. Among such processes, there is one developed by the present inventors which comprises irradiating a mixture comprising acetone, water and a monomer to be polymerized with an ionizing radiation at low temperatures. Namely, a single monomer of acrylamide or a mixture comprising a major part of an acrylamide monomer and a minor part of another monovinyl monomer such as acrylic acid, methacrylic acid, alkali metal salts of acrylic and methacrylic acids, vinylpyridine and dimethyl aminoethyl methacrylate is polymerized or copolymerized by means of an ionizing radiation in a mixed polymerization solvent comprising 5 – 60% by volume of water, 5 – 50% by volume of a monomer to be polymerized and the balance volume of acetone at a reaction temperature in the range of $-20°$ C through $50°$ C. Thus, the polymer is produced as a precipitate in solid state separated from the polymerization solvent. Such process is described in Japanese Pat. Application No. 60265/1974.

In the course of a series of investigations concerning the polymerization of acrylamide in a mixed solvent comprising acetone and water, the present inventors have discovered that the addition of an alkaline salt, i.e., a salt which has a basic reaction, such as $Na_2CO_3$, $K_2CO_3$, $CH_3COONa$, $NaNO_2$, $Na_3PO_4$ and the like, to the polymerization solvent greatly improves the degree of polymerization of the polymers to be produced and also helps to prevent gelation of the polymers. When the polymerization is carried out in the absence of an alkaline salt at a high monomer concentration or in a mixed solvent such as one containing 15 – 25% by volume of water, gelation of the produced polymer easily takes place because of the intermolecular crosslinking. The addition of an alkaline salt in accordance with the present invention prevents this gelation and enables the production of water-soluble polymers.

In the practice of the present invention, a reaction temperature within the range of $0°$ C through $40°$ C is preferably employed. The proportion of water in the acetone-water mixture is preferably within the range of 5% through 60% by volume, and the monomer concentration in the solvent is preferably within the range of 5% through 50% by volume. The amount of an alkaline salt to be added to the solvent in accordance with the invention varies in amount within the range of 0.01% through 10% by mole based on the amount of the monomer to be polymerized, but the range of 0.1% through 5% by mole is preferred. When the amount of salt added is too small, no substantial advantage can be obtained, and when it is too large, the yield of polymer decreases. A dose rate in the range of 10 to $10^6$ roentgens/hour may be employed in the practice of the present invention, but the range of $10^2$ to $10^5$ roentgens/hour is preferably for the efficient production of polymers with high polymerization degree.

Total dose required to obtain close to 100% conversion is usually in the range of $10^3 - 10^5$ rad, although this is not critical.

The following examples are not restrictive but only illustrate some preferred embodiments of the present invention.

EXAMPLE 1

Into a solution of 10 g of acrylamide dissolved in a mixture comprising 60 ml of acetone and 40 ml of water, 0.002 mole of $K_2CO_3$ was added and nitrogen bubbling was done sufficiently to purge air. Then, at the reaction temperature of $0°$ C, the solution was irradiated with $\gamma$-rays from Cs-137 at a dose rate of $6.2 \times 10^2$ rad/hr for 6 hours. The polymer was obtained in yield of 75%. The inherent viscosity of this polymer measured at $30°$ C in an aqueous solution of $1N-NaNO_3$ was 14.5 dl/g.

When the polymerization was carried out in the same way as mentioned above except that no salt was added to the polymerization solvent, the polymer was obtained in yield of 84%, the inherent viscosity determined in the same conditions as mentioned above being 7.5 dl/g. The above experimental results clearly show that the addition of a salt to the polymerization solvent remarkably increases the molecular weight of the polymer product, although it may slightly decrease the yield of the polymer.

EXAMPLE 2

Into an aqueous solution comprising 20 g of acrylamide, 60 ml of acetone and 40 ml of water, 0.001 mole of $K_2CO_3$ was added, and using the resulting solution as a polymerization solvent, the polymerization was carried out in the same way as mentioned in Example 1.

The yield of the polymer was 65% and the inherent viscosity of the polymer thus produced was 16.7 dl/g.

In case the same polymerization was carried out except that no salt was added to the solvent, polymers were water-insoluble whenever they were obtained in yield of above 50%.

EXAMPLES 3 – 5.

Into a solution consisting of 60 ml of acetone, 40 ml of water and 10 g of acrylamide, $Na_2CO_3$ was added in amounts given in Table 1 below to make the polymerization solvent for each run. All polymerization reactions were carried out at 35° C by means of irradiation at a dose rate of $4.7 \times 10^2$ rad/hr. The relation between the amount of $Na_2CO_3$ added to the solvent and the inherent viscosity and the yield of the produced polymer was as shown in the same table.

Table 1

| Run | $Na_2CO_3$ (mol/l) | Yield (%) | $[\mu]$(dl/g) |
|---|---|---|---|
| Example 3 | 0.00025 | 65 | 7.5 |
| Example 4 | 0.0005 | 70 | 6.5 |
| Example 5 | 0.003 | 62 | 6.0 |
| Reference | 0 | 61 | 4.8 |

The above results clearly show that the addition of $Na_2CO_3$ to the polymerization solvent increases the molecular weight of the produced polymers.

EXAMPLE 6

The same experiment as in Example 1 was repeated except that 28.4 g, instead of 10 g, of acrylamide and 0.008 mole, instead of 0.002 mole, of $K_2CO_3$ were used. The polymer was obtained in yield of 93%. The inherent viscosity of this polymer was 19.8 dl/g as determined in the same conditions as in Example 1.

When the same polymerization was carried out without using the salt, the polymer obtained was water-insoluble.

What we claim is:

1. A process for the production of high molecular weight acrylamide polymers which comprises irradiating a solution comprising acetone, water and an acrylamide monomer with an ionizing radiation in the presence of an alkaline salt in an amount ranging from about 0.01 through about 10 mol % based on the total amount of monomer or monomers to be polymerized.

2. A process for the production of high molecular weight acrylamide polymers which comprises irradiating a solution comprising 5 - 60% by volume of water, 5 - 50% by volume of an acrylamide monomer and the balance volume of acetone with an ionizing radiation in the presence of an alkaline salt in an amount ranging from about 0.01 through about 10 mol % based on the total amount of monomer or monomers to be polymerized.

3. A process for the production of high molecular weight acrylamide polymers which comprises irradiating a solution comprising 5 - 60% by volume of water, 5 - 50% by volume of an acrylamide monomer and the balance volume of acetone with an ionizing radiation at a dose rate ranging from 10 roentgens/hr through $10^6$ roentgens/hr in the presence of an alkaline salt in an amount ranging from about 0.01 through about 10 mol % based on the total amount of monomer or monomers to be polymerized.

4. A process for the production of high molecular weight acrylamide polymers which comprises irradiating a solution comprising 5 - 60% by volume of water, 5 - 50% by volume of an acrylamide monomer and the balance volume of acetone with an ionizing radiation at a dose rate ranging from 10 through $10^6$ roentgens/hour at a temperature in the range of $-20°$ C through 50° C in the presence of an alkaline salt in an amount ranging from about 0.01 through about 10 mol % based on the total amount of monomer or monomers to be polymerized.

5. A process of claim 1 in which the monomer to be polymerized is acrylamide or a mixture of acrylamide and another monovinyl monomer.

6. A process of claim 5 in which the monovinyl monomer is a member selected from the group consisting of acrylic acid, methacrylic acid, alkali metal salts of acrylic and methacrylic acid, vinylpyridine and dimethyl aminoethyl methacrylate.

7. A process of claim 1 in which the alkaline salt is a member selected from the group consisting of $Na_2CO_3$, $K_2CO_3$, $CH_3COONa$, $NaNO_2$ and $Na_3PO_4$.

8. A process of claim 2 in which the alkaline salt is a member selected from the group consisting of $Na_2CO_3$, $K_2CO_3$, $CH_3COONa$, $NaNO_2$ and $Na_3PO_4$.

9. A process of claim 3 in which the alkaline salt is a member selected from the group consisting of $Na_2CO_3$, $K_2CO_3$, $CH_3COONa$, $NaNO_2$ and $Na_3PO_4$.

10. A process of claim 4 in which the alkaline salt is a member selected from the group consisting of $Na_2CO_3$, $K_2CO_3$, $CH_3COONa$, $NaNO_2$ and $Na_3PO_4$.

11. A process of claim 5 in which the alkaline salt is a member selected from the group consisting of $Na_2CO_3$, $K_2CO_3$, $CH_3COONa$, $NaNO_2$ and $Na_3PO_4$.

12. A process of claim 6 in which the alkaline salt is a member selected from the group consisting of $Na_2CO_3$, $K_2CO_3$, $CH_3COONa$, $NaNO_2$ and $Na_3PO_4$.

* * * * *